(No Model.)
S. H. NYE.
DOOR HANGER.
No. 319,113. Patented June 2, 1885.
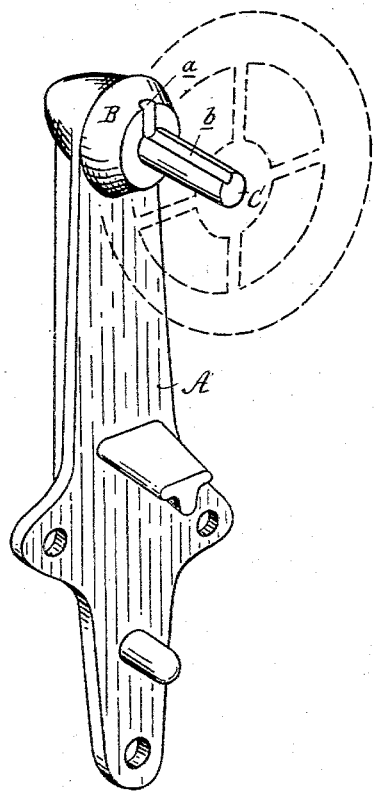
Attest:
A. Barthel
[signature]
Inventor:
Silas H. Nye
by his Atty Thos. S. Sprague

UNITED STATES PATENT OFFICE.

SILAS H. NYE, OF UNION CITY, MICHIGAN.

DOOR-HANGER.

SPECIFICATION forming part of Letters Patent No. 319,113, dated June 2, 1885.

Application filed December 10, 1884. (No model.)

*To all whom it may concern:*

Be it known that I, SILAS H. NYE, of Union City, in the county of Branch and State of Michigan, have invented new and useful Improvements in Barn-Door Hangers; and I do hereby declare that the following is a full, clear, and exact description thereof, reference being had to the accompanying drawing, which forms a part of this specification.

This invention relates to certain new and useful improvements in the construction of barn-door hangers, the object of the invention being to provide means whereby the rollers may be easily and readily lubricated.

The invention consists in the peculiar construction, arrangement, and combination of the various parts, all as more fully hereinafter set forth.

In the accompanying drawing, which forms a part of this specification, I show a barn-door hanger in perspective, with the roller in dotted outline, and in which A represents a hanger of any desired construction and conformation, the head B of which is provided with the stub shaft or arm C, as in the usual manner of constructing such devices, and upon which the roller is journaled. In the head B of the hanger I form a recess, $a$, the bottom of which communicates with a channel or groove, $b$, formed in the upper face of the shaft C. It will be observed that the recess $a$ is open upon its front side, and that the inner end of the hub of the roller will, when in place upon the shaft, close such open side. As oil is placed in the recess $a$ it will flow from thence into the channel $b$ in the shaft, and as the roller rotates in opening or closing the door upon which the device is secured the oil will be drawn from the recess and channel, thus lubricating the shaft and the end of the hub of the roller next the head.

What I claim as my invention is—

A barn-door hanger the head B of which is provided with a recess, $a$, communicating with a channel, $b$, in the shaft, substantially as and for the purposes set forth.

SILAS H. NYE.

Witnesses:
H. S. SPRAGUE,
E. SCULLY.